A. A. CURRY.
RESILIENT WHEEL.
APPLICATION FILED SEPT. 29, 1910.
996,838.
Patented July 4, 1911.
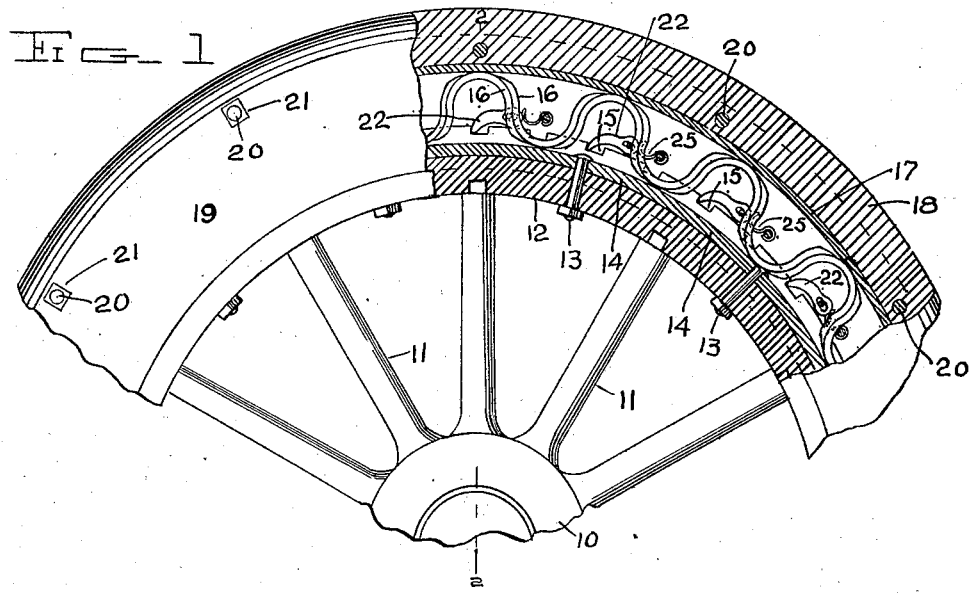
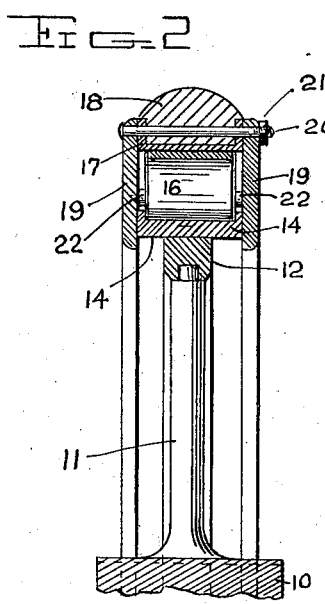
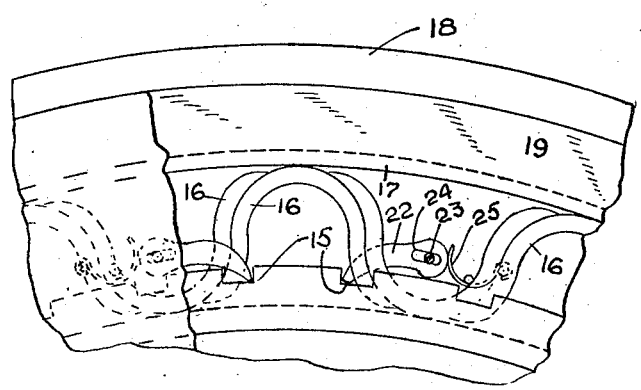
WITNESSES:
S. W. Atherton.
C. H. Sheehan.
INVENTOR
Alfred A. Curry
BY
A. M. Wooster
ATTORNEY
COLUMBIA PLANOGRAPH CO., WASHINGTON, D. C.

UNITED STATES PATENT OFFICE.

ALFRED A. CURRY, OF BRIDGEPORT, CONNECTICUT, ASSIGNOR OF ONE-HALF TO EDWIN B. KNOWLES AND ONE-TWENTIETH TO CHARLES. S. CANFIELD, BOTH OF BRIDGEPORT, CONNECTICUT.

RESILIENT WHEEL.

996,838.

Specification of Letters Patent. Patented July 4, 1911.

Application filed September 29, 1910. Serial No. 584,477.

*To all whom it may concern:*

Be it known that I, ALFRED A. CURRY, a citizen of the United States, residing at Bridgeport, county of Fairfield, State of Connecticut, have invented an Improvement in Resilient Wheels, of which the following is a specification.

This invention has for its object to provide a simple, durable and inexpensive resilient wheel for vehicles, more especially motor cars and trucks, which shall have to the fullest extent the yielding and easy riding qualities of pneumatic wheels without any of the objections that are inherent in pneumatic wheels.

With these ends in view I have devised the simple and novel resilient wheel which I will now describe, referring to the accompanying drawing forming a part of this specification and using reference characters to indicate the several parts:

Figure 1 is a side elevation of a portion of my novel wheel parts being shown in longitudinal section; Fig. 2 a transverse section on the line 2—2 in Fig. 1; and Fig. 3 is an enlarged detail elevation with the tread removed.

10 denotes the hub, 11 spokes and 12 the felly. These parts may be of wood and of any ordinary or preferred construction. Outside the felly and rigidly secured thereto, as by bolts 13, is an inner rim 14 provided with angular notches 15. I preferably use a channel rim and form the notches in the side flanges thereof. Resting upon the channel rim and unsecured are rounded U-shaped springs 16. Each alternate spring is inverted and lies between the contiguous springs, the ends being turned outward and tapered down to a relatively thin edge. The springs are all alike and the inverted springs fit within the contiguous springs, their surfaces being in contact, as clearly shown in Figs. 1 and 3.

17 denotes an outer rim, preferably a channel rim, which rests upon the arches of alternate springs but wholly out of contact with the inverted springs.

18 denotes the tread which is rigidly secured to the outer rim. I have shown the outer rim as a channel rim and the tread as overlying the edges of the side flanges thereof (see Fig. 2). This tread may be made of any durable and relatively inexpensive material other than metal, for example, fiber, so called, or any analogous plastic material that can be molded to form.

19 denotes ring-shaped side plates which extend approximately to the top of the side flanges of the outer rim and preferably below the base of the inner rim. The side plates and the tread are rigidly secured to the outer rim by bolts 20 which pass through said parts transversely and are secured by nuts 21, as clearly shown in Fig. 2.

22 denotes dogs which are loosely pivoted to the side plates and engage the angular notches 15 in the inner rim. It should be noted that the dogs carried by the respective side plates extend in opposite directions, as clearly shown in Fig. 3, in which the dogs on the near side are shown as extending toward the right and engaging notches in the near side of the inner rim, and the dogs on the far side are shown as extending toward the left and engaging notches in the far side of the inner rim. The studs 23 on which the dogs are pivoted pass through slots 24 in the dogs so as to give ample backward and forward movement to the dogs, as will be more fully explained. The dogs are retained in operative engagement with the notches and in engagement with the far ends of the notches by springs 25 secured to the respective side plates.

In use, the weight and all shocks and blows are taken up by springs 16 which yield more or less, depending of course upon the weight carried, the speed and the roughness of the roadway. It will be understood from the drawing that while the inner rim is rigidly secured to the spokes, and the tread and outer rim are rigidly secured to the side plates, the side plates are loosely held in place by the dogs only and have oscillatory movement relatively to the inner rim. The amount of movement depends of course upon the yield of the springs, and the extreme amount of movement is limited by the engagement of one set of dogs or the other with the forward ends of the angular notches in the corresponding side of the inner rim, the resiliency of the wheel being produced by the yielding of the springs and the oscillatory movement of the tread, outer rim and side plates relatively to the inner rim.

Having thus described my invention I claim:

1. A resilient wheel comprising a relatively fixed inner rim, a series of U-shaped springs alternately inverted resting thereon, an outer rim resting on the arches of alternate springs, side plates secured to the outer rim and pivoted dogs secured to the side plates, and means for holding said dogs yieldingly in engagement with the inner rim whereby oscillation of the outer rim is permitted when the springs yield.

2. A resilient wheel comprising a relatively fixed inner rim having notches, a series of U-shaped springs alternately inverted resting on said rim, an outer rim resting on the arches of alternate springs, side plates secured to the outer rim and pivoted dogs secured to the side plates, and means for holding said dogs yieldingly in engagement with the notches in the inner rim, the dogs on the respective side plates extending in opposite directions.

3. A resilient wheel comprising a relatively fixed inner channel rim having angular notches, a series of springs resting on said rim, an outer rim resting on said springs, side plates secured to the outer rim and oppositely extending pivoted dogs secured to the respective side plates, and means for holding said dogs yieldingly in engagement with the notches in the inner rim.

4. A resilient wheel comprising a relatively fixed inner channel rim having notches, a series of U-shaped springs alternately inverted resting on said rim, an outer rim resting on the arches of alternate springs, side plates secured to the outer rim, studs engaging the side plates, oppositely extending dogs engaging the notches and having slots through which said studs pass and springs for retaining the dogs in operative position.

5. A resilient wheel comprising a relatively fixed inner rim, a series of U-shaped springs alternately inverted resting thereon, the outer ends of said springs being outwardly turned and beveled, an outer rim resting on the arches of alternate springs but out of contact with the inverted springs, side plates secured to the outer rim and oppositely extending pivoted dogs pivoted to the respective side plates, and means for holding said dogs yieldingly in engagement with the inner rim.

6. A resilient wheel comprising a relatively fixed inner rim, a series of U-shaped springs alternately inverted resting thereon, the outer ends of said springs being outwardly turned and beveled, an outer rim resting on the arches of alternate springs but out of contact with the inverted springs, side plates secured to the outer rim, oppositely extending dogs loosely pivoted to the respective side plates, and springs acting to retain the dogs in operative position.

In testimony whereof I affix my signature in presence of two witnesses.

ALFRED A. CURRY.

Witnesses:
A. M. WOOSTER,
S. W. ATHERTON.

Copies of this patent may be obtained for five cents each, by addressing the "Commissioner of Patents, Washington, D. C."